(12) United States Patent
Jang (10) Patent No.: US 10,099,719 B2
(45) Date of Patent: Oct. 16, 2018

(54) APPARATUS AND METHOD FOR MEASURING OFFSET OF EPS MOTOR POSITION SENSOR

(71) Applicant: MANDO CORPORATION, Pyeongtaek-si, Gyeonggi-do (KR)

(72) Inventor: HyunSeop Jang, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 332 days.

(21) Appl. No.: 14/994,142

(22) Filed: Jan. 13, 2016

(65) Prior Publication Data

US 2016/0207562 A1 Jul. 21, 2016

(30) Foreign Application Priority Data

Jan. 20, 2015 (KR) .................. 10-2015-0009055

(51) Int. Cl.
*G01B 7/00* (2006.01)
*B62D 5/04* (2006.01)
*G01D 5/244* (2006.01)

(52) U.S. Cl.
CPC .......... *B62D 5/046* (2013.01); *B62D 5/0481* (2013.01); *G01D 5/24485* (2013.01)

(58) Field of Classification Search
CPC ... B62D 5/046; B62D 5/0481; G01D 5/24485
See application file for complete search history.

(56) References Cited

U.S. PATENT DOCUMENTS 6,392,854 B1* 5/2002 O'Gorman ........... B62D 5/0487
180/443
2010/0253268 A1* 10/2010 Marvelly .................. H02P 6/14
318/400.26

FOREIGN PATENT DOCUMENTS

KR 1020120103151 A 9/2012

OTHER PUBLICATIONS

Korean Office Action dated Apr. 21, 2016 in connection with the counterpart Korean Patent Application No. 10-2015-0009055.

* cited by examiner

*Primary Examiner* — Daniel Miller
(74) *Attorney, Agent, or Firm* — Hauptman Ham, LLP (57) ABSTRACT

The present invention relates to an apparatus for measuring an offset of an EPS motor position sensor and a method therefor, the apparatus comprising: a drive motor that drives an EPS motor at a predetermined constant speed; a back electromotive force measurement unit that measures a back electromotive force generated by the EPS motor so as to generate a back electromotive force signal; a motor position sensor that senses the rotation of the EPS motor so as to generate a position signal; and an offset calculation unit that calculates an offset value by using a difference between the back electromotive force signal measured in the back electromotive measurement unit and the position signal generated by the motor position sensor.

11 Claims, 4 Drawing Sheets

APPARATUS AND METHOD FOR MEASURING OFFSET OF EPS MOTOR POSITION SENSOR

CROSS-REFERENCE TO RELATED APPLICATION

This application claims priority from and the benefit under 35 U.S.C. § 119(a) of Korean Patent Application No. 10-2015-0009055, filed on Jan. 20, 2015, which is hereby incorporated by reference for all purposes as if fully set forth herein.

BACKGROUND OF THE INVENTION

1. Field of the invention

The present invention relates to an apparatus and method for measuring an offset of an EPS motor position sensor and, more particularly, an apparatus and method for measuring an offset of an EPS motor position sensor, which can accurately detect an actual rotation angle of the EPS motor by measuring a difference between an actual rotation angle of the EPS motor generated by a mechanical tolerance of the motor position sensor and a value sensed by the motor position sensor.

2. Description of the Prior Art

In general, an Electronic Power Steering (EPS) is mounted on a vehicle so as to easily steer a steering wheel, and an EPS device assists a steering force of a driver using a rotational force of the motor.

The EPS device is provided with an Electronic Control Unit (ECU) that controls the driving of the EPS motor while steering the steering wheel. The ECU receives a signal from a steering angle sensor, a torque sensor, a vehicle speed sensor, and engine rpm sensor, etc., calculates a current value, and provides the calculated current value to the EPS motor so as to control a steering sense of the steering wheel.

As such, when an assistance steering force is controlled by adjusting the current value supplied to the EPS motor, a motor position sensor is used to determine whether the EPS motor is driven at a predetermined rotation angle or a predetermined rotation speed. In general, the motor position sensor is installed on a rotary shaft of the EPS motor in the EPS motor, and senses a rotational speed of the EPS motor by sensing the rotation of a magnet attached to the rotation shaft of the EPS motor.

In order to accurately sense the rotation angle or the rotation speed of the EPS motor, the motor position sensor should be mounted so as to exactly match a center of a rotation shaft of the EPS motor. However, a position difference between the center of the rotation shaft of the EPS motor and a center point of the motor position sensor may occur due to the mechanical tolerance.

Meanwhile, the conventional EPS motor includes a motor position sensor mounted in the EPS motor, and includes a separate EEPROM for storing an offset value for calibrating (correcting) a difference between an actual rotation angle or a rotation speed of the EPS motor and a value sensed by the motor position sensor. Accordingly, the conventional EPS motor has disadvantages in that a cost increases due to the provision of the EEPROM and the size of the EPS motor is large.

To address this problem, it is necessary to propose a method for mounting the motor position sensor to the outside of the EPS motor so as to reduce the size of the EPS motor, and for storing an offset value in an ECU EEPROM that is a memory provided in the ECU, not a separate storage means.

At the same time, as the motor position sensor is mounted on the outside of the EPS motor, it is necessary to develop a method for calibrating/correcting a difference between an actual rotation speed (angle) of the EPS motor, which is distinguished from a conventional case where the motor position sensor is located inside the motor, and a value sensed by the motor position sensor.

SUMMARY OF THE INVENTION

The present invention proposes an apparatus and method for measuring an offset of an EPS motor position sensor having a motor position sensor mounted on the outside of an EPS motor so as to reduce the size of the EPS motor and not requiring an EEPROM for storing an offset value.

The present invention proposes an apparatus and method for measuring an offset of an EPS motor position sensor which calculates an offset value between a center point of the motor and a center point of the motor position sensor, in order to correct a difference between an actual rotation angle or rotation speed of the EPS motor and a value sensed by the motor position sensor.

The above purpose can be achieved by an apparatus for measuring an offset of an EPS motor position sensor, the apparatus including: a drive motor that drives an EPS motor at a predetermined constant speed; a back electromotive force measurement unit that measures a back electromotive force generated by the EPS motor so as to generate a back electromotive force signal; a motor position sensor that is installed outside the EPS motor and senses the rotation of the EPS motor so as to generate a position signal; and an offset calculation unit that calculates an offset value by using a difference between the back electromotive force signal measured in the back electromotive measurement unit and the position signal generated by the motor position sensor.

The above purpose can be achieved by a method for measuring an offset of an EPS motor position sensor, the method including: driving an EPS motor at a predetermined constant speed using an external drive motor; generating a back electromotive force signal by measuring a back electromotive force generated by the EPS motor; generating a position signal by sensing a rotation of the EPS motor; and calculating an offset value by using a difference between the back electromotive force signal and the position signal.

According to the present invention, a difference between an actual rotation angle or rotation speed of the EPS motor and a position measured by the motor position sensor is corrected by using an offset value so that the actual rotation angle of the EPS motor can be accurately detected.

Specifically, an offset between a center point or a reference point of the motor (rotation shaft) and a center point or a reference point of the motor position sensor is measured so as to compensate a measurement value of the motor position sensor accordingly, thereby enabling the correct calculation of the rotation angle of the EPS motor.

More specifically, while using a separate drive motor for driving the EPS motor, an offset between the reference point of the motor (a rotation shaft) and the reference point of the motor position sensor can be measured by using the back electromotive force generated in the EPS motor and the position signal of the motor position sensor, and thereby compensating a measurement value of the motor position sensor.

In addition, the size of the EPS motor can be reduced by mounting the motor position sensor to the outside of the EPS motor, and a separate EEPROM is not required in the EPS motor so as to reduce a cost.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, embodiments of the present invention will be described with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
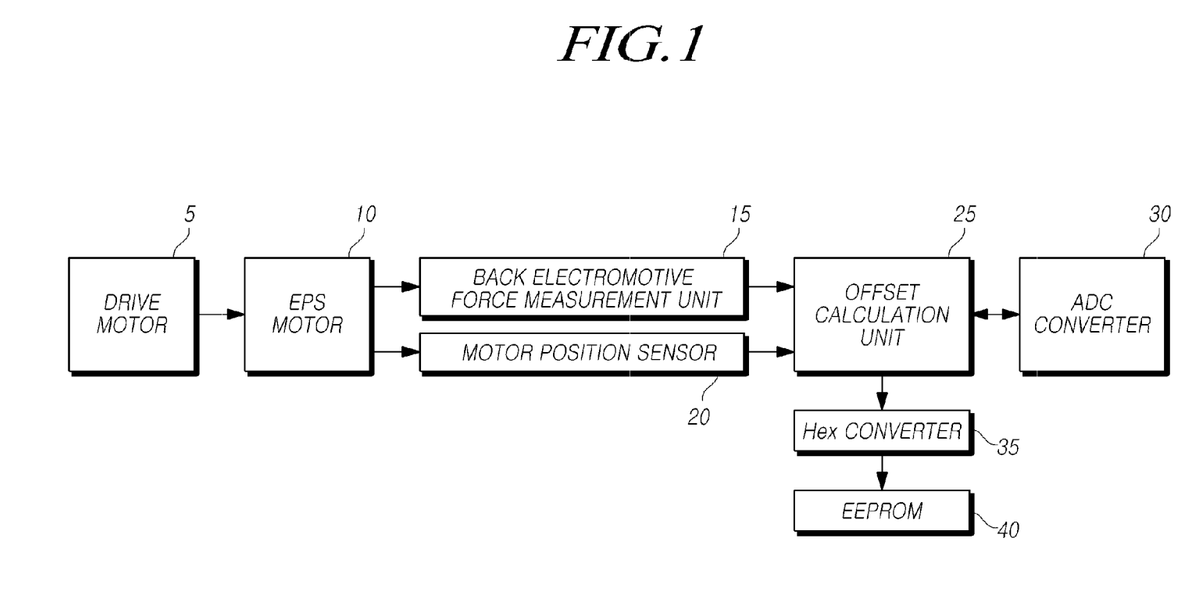
FIG. 1 is a configuration block diagram of an offset measurement apparatus of an EPS motor according to the present invention.

FIG. 1 is a configuration block diagram of an offset measurement apparatus of an EPS motor according to the present invention.

An apparatus for measuring an offset of an EPS motor 10 according to the present invention measures an offset value which is a difference between an actual rotation angle of the EPS motor 10 that occurs by a mechanical tolerance of a motor position sensor 20 and a sensing value of the motor position sensor 20, so as to accurately detect an actual rotation angle of the EPS motor 10.

In theory, a center point or a reference point of the motor position sensor 20 should be matched with a center point or a reference point of a rotation shaft of the EPS motor 10.

However, during a process of attaching the motor position sensor 20 to an EPS motor assembly, the positions of the two center points or reference points may be mismatched with each other etc., and accordingly a difference may occur between a rotation angle sensing value of the motor measured by the motor position sensor 20 and a rotation angle of an actual motor rotation shaft.

At this time, the difference between the rotation angle sensing value of the motor measured by the motor position sensor 20 and the rotation angle of the actual motor rotation shaft, or the difference between the center point and the reference point of the motor position sensor 20 and the center point and the reference point of the rotation shaft of the EPS motor 10 can be defined as an 'offset' of the EPS motor.

This phenomenon can be generated more significantly when the motor position sensor 20 is mounted outside the EPS motor such as a case to which the present embodiment is applied than a case where the motor position sensor 20 is mounted inside the EPS motor.

That is, when the motor position sensor 20 is mounted outside the EPS motor, the alignment between reference points of a motor rotation shaft and the motor position sensor 20 may be more difficult, and thus the offset of the EPS motor may be large.

Thus, the purpose of an embodiment of the present invention is to measure the EPS motor offset so as to compensate the measurement value of the motor position sensor, and thereby improve the reliability of the measurement value by the motor position sensor.

An apparatus for measuring an offset of an EPS motor 10 according to the present invention may include a drive motor 5 for driving an EPS motor 10, a back electromotive force measurement unit 15 for measuring a back electromotive force generated by the EPS motor 10, a motor position sensor 20 for sensing the rotation of the EPS motor 10, an offset calculation unit 25 for calculating an offset value by using a back electromotive force signal detected when the EPS motor 10 is driven and a position signal detected by the motor position sensor 20, an ADC converter 30 for digitizing the value calculated by the offset calculation unit 25, and a Hex converter 35 for converting the calculated offset value into a hexadecimal.

The EPS motor 10 is a permanent magnet synchronous motor, and uses a Permanent Magnet Synchronous Motor (PMSM) or a 3 phase Blushless DC (BLDC) motor. In general, a driving condition of the permanent magnet synchronous motor is as follows: in order to generate a continuous torque, a rotor should rotate in synchronization with a frequency of the current flowing through a stator, and in order to generate the maximum torque of the motor, an angle of a rotating magnetic field of the permanent magnet and the stator should be maintained at 90 degrees. In order to satisfy such driving conditions, an offset value between an electrical angle (back-EMF) and a mechanical angle (a position signal) occurring in the rotating magnetic field due to the permanent magnet should be measured so as to be corrected.

One end of the rotor of the EPS motor 10 is provided with a magnet (not shown), and the motor position sensor 20 may determine the rotation angle of the EPS motor 10 by detecting the rotation of the magnet. A plurality of magnets are arranged on a magnet along the circumferential direction, that is, a plurality of N poles and S poles are arranged alternately, and as the number of N poles and S poles increases, the accurately of the rotation angle of the EPS motor 10 also increases.

The drive motor 5 may be connected for driving the EPS motor 10 and rotating the EPS motor 10 in forward and reverse directions at a predetermined constant RPM or higher. The drive motor 5 may drive the EPS motor 10 at the predetermined constant RPM or higher, and any type of motor capable of driving in forward and reverse directions may be used as the drive motor, an example of which may be a servo motor.

That is, in a case where the drive motor 5 is in a form of a servo motor coupled to the EPS motor by a gear or a belt, etc., the drive motor is driven dependent on the rotation of the EPS motor during a process of a conventional EPS operation. However, in a case of the EPS offset measuring process of the present invention, the drive motor controls the EPS motor so as to rotate depending on the driving rotation of the drive motor 5.

Of course, it is not necessary that the drive motor 5 is always mechanically connected to the EPS motor 10, and the drive motor 5 may be mechanically connected to the EPS motor 10 during only the EPS motor offset measuring process.

When the drive motor 5 is driven by EPS motor 10, the EPS motor 10 is forcibly driven by the drive motor 5 because a direct voltage or a steering auxiliary current is not applied to EPS motor 10, and accordingly, the back electromotive force is generated at the stator of the EPS motor 10.

Figure 2:
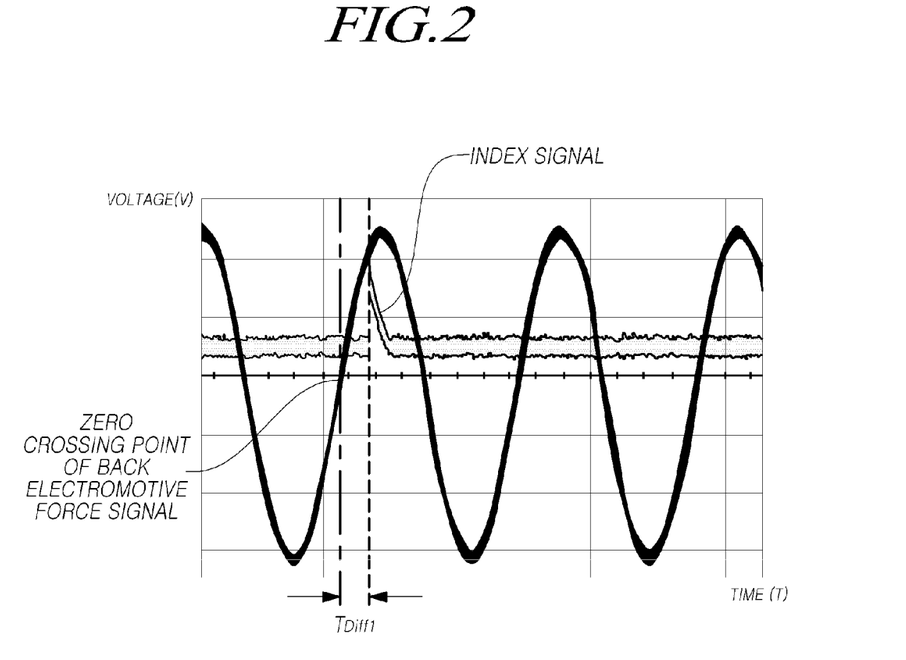
FIG. 2 is a graph showing a back electromotive signal of an EPS motor measured when the EPS motor is positively rotated and a position signal generated by a motor position sensor.
Figure 3:
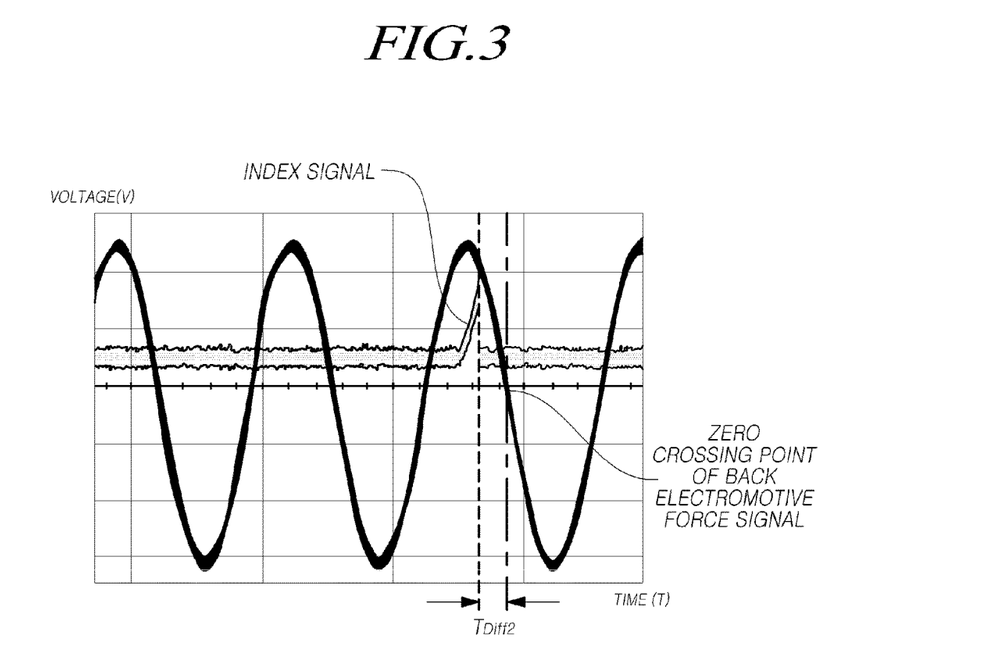
FIG. 3 is a graph showing a back electromotive signal of an EPS motor measured when the EPS motor is negatively rotated and a position signal generated by a motor position sensor.

At this time, the generated back electromotive force has a sine wave shape as shown in the graph of FIG. 2 or FIG. 3, and the number of sine waves generated within a predetermined time may vary according to the number of coils wound to the stator or the number of poles of the stator.

A plurality of pairs of coils is wound around the stator, and each pair forms an N pole and an S pole. Therefore, since the number of N poles and S poles increases as the number of pairs of coils increases, the number of sine waves generated within a predetermined time increases and the width of the sine wave is lessened.

The EPS motor 10 is rotated in a forward or reverse direction by the drive motor 5, and, in the present invention, each of a back electromotive force generated when the EPS motor 10 is rotated in a forward direction by the drive motor 5, and a back electromotive force generated when the EPS motor 10 is rotated in a reverse direction by the drive motor 5 is measured so as to be compared with an index signal from the motor position sensor 20, which will be described later.

On the other hand, the reason for driving the drive motor 5 at a predetermined RPM or higher is that, when the RPM is low, the measurement of a back electromotive force is difficult because a magnitude of the back electromotive force generated by the EPS motor 10 is small and the slope of the sine wave is low, and thus, there is a high probability that errors will occur when measuring a difference in comparison with the index signal.

Accordingly, in an embodiment of the present invention, the rotation speed of the drive motor and EPS motor for measuring an EPS motor offset is preferably at least 1200 RPM.

The back electromotive force measurement unit 15 may measure the back electromotive force generated when the EPS motor 10 is rotated in a forward direction or in a reverse direction by the drive motor 5 so as to generate a back-EMF signal, and provide the back-EMF signal to an offset calculation unit 25. In addition, the back electromotive force measurement unit 15 may provide the measured back electromotive force signal to a device for displaying a signal such as an oscilloscope so as to display a graph as shown FIG. 2 or FIG. 3 to an experimenter.

As shown in FIG. 2 and FIG. 3, a back electromotive force signal generated by the back electromotive force measurement unit 15 is a sine wave shape having a predetermined period and amplitude, and a time point at which an output voltage becomes zero exists in the sine wave. This time point can be called a zero crossing point.

On the other hand, the motor position sensor 20 may sense the rotation of the magnet which is installed at one end of the rotor of the EPS motor 10 so as to grasp a rotation speed and rotation angle of the EPS motor 10.

In particular, as shown in FIG. 2 or FIG. 3, while generating a signal of a predetermined voltage level or less, the motor position sensor 20 generates an index signal having a predetermined voltage or greater when the magnet makes one rotation.

As shown in FIG. 2 and FIG. 3, the motor position sensor 20 generates an index signal that is a predetermined output value or greater when the rotor passes through a constant reference point of the output while generating a predetermined output or less.

In theory, when the position of the center of the rotor of the EPS motor 10 and the reference point of the motor position sensor 20 are exactly matched with each other, the zero crossing point of the back electromotive force signal should be the same as a starting point of the index signal of the motor position sensor 20. However, when the center of the rotor of the EPS motor 10 and the position of the reference point of the motor position sensor 20 are not matched with each other, as shown in FIG. 2 or FIG. 3, a difference may occur between the zero crossing point of the back electromotive force signal and the starting point of the index signal.

The offset calculation unit 25 may calculate an offset value for the rotation angle and the rotation speed of the EPS motor 10 using the back electromotive force signal generated by the EPS motor 10 and the position signal detected by the motor position sensor 20.

More specifically, as shown in FIG. 2, the offset calculation unit 25 may measure a time difference between the starting point of the index signal and the zero crossing point of the back electromotive force signal from a position signal detected and generated by the motor position sensor 20, and may convert the measured time difference into an angular value.

As the drive motor 5 rotates the EPS motor 10 in forward and reverse directions, the offset calculation unit 25 may measure a time difference TDiff1 between the starting point of the index signal and the zero crossing point of the back-EMF signal generated when the EPS motor 10 rotates in the forward direction, and a time difference TDiff2 between the starting point of the index signal and the zero crossing point of the back-EMF signal generated when the EPS motor 10 rotates in the reverse direction.

At this time, the position signal and the back EMF signal generated when the EPS motor 10 rotates in a forward direction are the same as shown in FIG. 2, and the position signal and the back EMF signal generated when the EPS motor 10 rotates in a reverse direction has a decalcomanic form with the graph of FIG. 2, as shown in FIG. 3.

However, the time difference TDiff1 between the starting point of the index signal and the zero crossing point of the back-EMF signal generated when the EPS motor 10 rotates in a forward direction, and the time difference TDiff2 between the starting point of the index signal and the zero crossing point of the back-EMF signal generated when the EPS motor 10 rotates in a reverse direction may be different from each other.

Since a graph generated when the EPS motor 10 rotates in the forward direction and a graph generated when the EPS motor 10 rotates in a reverse direction form a decalcomania, the offset calculation unit 25 acquires a time difference by comparing a zero crossing point of the back electromotive force signal formed on a left side of the index signal and a starting point of the index signal, when comparing the starting point of the index signal and the zero crossing point of the back-EMF signal generated when the EPS motor 10 rotates in the forward direction.

On the other hand, when comparing the starting point of the index signal and the zero crossing point of the back-EMF signal generated when the EPS motor 10 rotates in the reverse direction, the offset calculation unit 25 acquires a time difference by comparing a zero crossing point of the back electromotive force signal formed on a right side of the index signal and the starting point of the index signal.

Then, the offset calculation unit 25 may convert, using equation 1 below, the time difference TDiff1 measured when the EPS motor 10 rotates in the forward direction and the time difference TDiff2 measured when the EPS motor 10 rotates in the reverse direction into an angular difference value, respectively.

$$\text{Angular difference} = \quad [\text{Equation 1}]$$
$$TDiff * \text{rotational angular velocity of } EPS$$
$$\text{motor} * \text{number of poles of stator}/2 =$$
$$TDiff * (RPM \text{ of } EPS \text{ motor} * 360°/60s) *$$
$$\text{number of poles of stator}/2$$

The reason why the number of poles of the stator/2 is multiplied in the equation 1 is that the back electromotive force signal is an electrical angle calculated by only the stator (N, S) of the EPS motor, and an angular difference value of the motor offset to be actually obtained is a mechanical angle in unit of 360 degrees.

For example, since the angle (an electrical angle) calculated by only the time difference value between the zero-crossing point of the back-EMF signal and the index signal corresponds to one-fifth of the angular difference (mechanical angle) between the actual EPS motor rotation shaft reference point and the motor position sensor reference point, when the number of poles of the stator of the EPS motor 10 is ten, the number of poles of the stator/2 is multiplied.

The reason why the offset calculation unit 25 respectively measures the time difference when the EPS motor 10 rotates in the forward direction, and the time difference when the EPS motor 10 rotates in the reverse direction is that if the angular difference is calculated only upon forward rotation or reverse rotation, the offset upon reverse rotation is not corrected. That is, the calculation of the time difference during only the forward rotation makes an offset correction in the reverse rotation impossible and, the calculation of the time difference during only the reverse rotation makes an offset correction in the forward rotation impossible.

The ADC converter 30 may convert the angular difference value upon forward rotation calculated by the offset calculation unit 25 and the angular difference value calculated upon reverse rotation into a binary number of 16 bits, respectively.

The offset calculation unit 25 calculates the average of the forward rotation angular difference value and the reverse angular difference value which are converted into binary numbers by the ADC converter 30, so as to calculate an offset value.

A Hex converter 35 may convert the offset value of the binary number into a hexadecimal.

The offset value may be stored in an EEPROM 40 provided in the ECU of the EPS, and may be used to correct the index signal detected by the motor position sensor 20 in the future.

That is, when the motor position sensor 20 measures the rotation angle of the motor, the measurement value of the motor position sensor is to be compensated by reflecting the offset value stored in the EEPROM 40 in the measured sensing angle value.

On the other hand, since a case where the difference value between the offset value (angular difference value) acquired by the forward rotation and the offset value (angular difference value) acquired by the reverse rotation is a predetermined threshold value or greater is considered as a fail state, the offset calculation unit 25 of the offset measurement apparatus according to the present invention may not measure the offset or not store the offset value.

For example, since a case where the difference value between the offset value (angular difference value) acquired by the forward rotation and the offset value (angular difference value) acquired by the reverse rotation exceeds a threshold value of 15 degrees corresponds to a case where there is an error in the drive motor (a servo motor) or the motor position sensor, the EPS motor offset value according to the present invention cannot be trusted, and thus the offset measurement or the offset value storage according to the present invention may not be performed.

Figure 4:
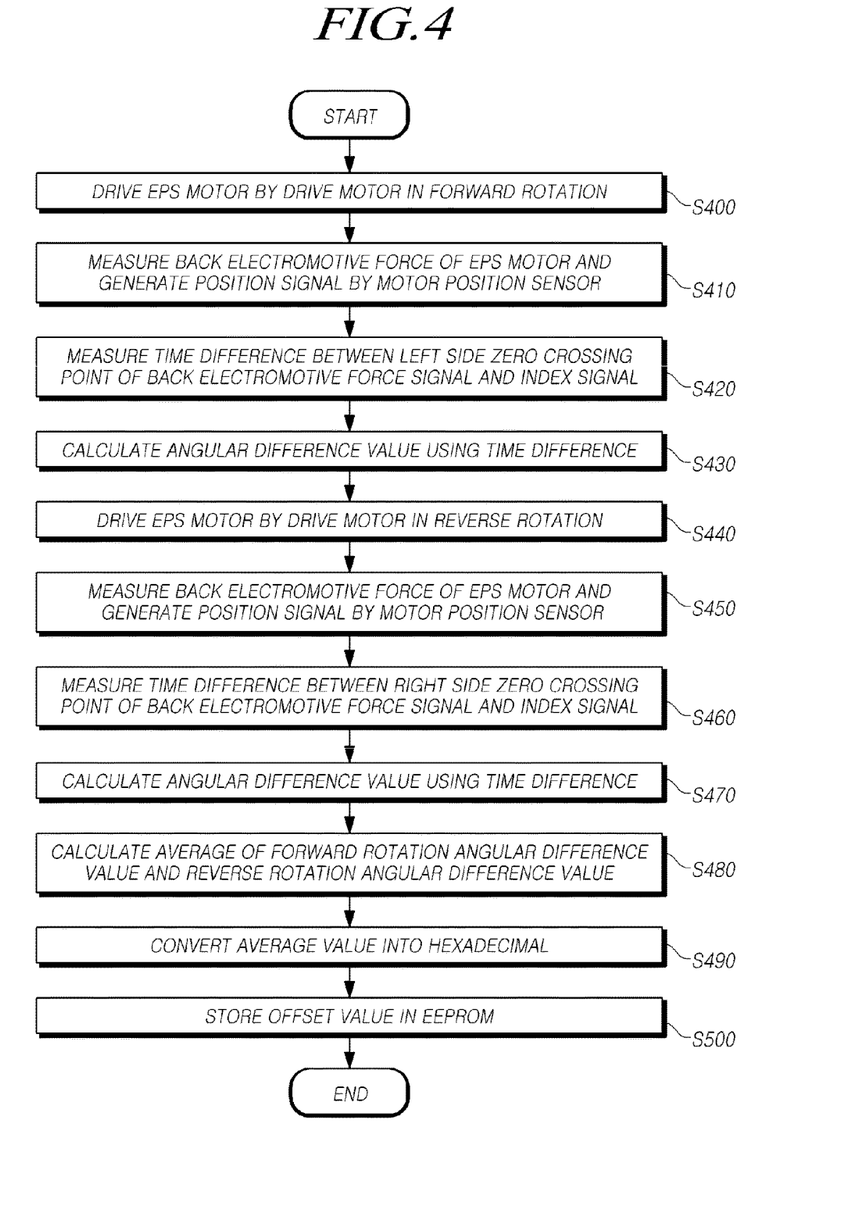
FIG. 4 is a flow chart illustrating a process of measuring an offset by an offset measurement apparatus of an EPS motor according to the present invention.

A process of measuring the offset by the offset measurement apparatus of the EPS motor 10 of the present invention according to the above configuration will be described with reference to FIG. 4 as follows.

Power is supplied to the ECU of the EPS device and then the power is supplied to the drive motor 5 so as to drive the EPS motor 10 at a predetermined RPM or more. The drive motor 5 rotates the EPS motor 10 in a forward direction or a reverse direction, and the stator of the EPS motor 10 generates a back electromotive force during the forward rotation or reverse rotation.

When the EPS motor 10 is rotated by the drive motor 5 in the forward direction in step S400, the back electromotive force measurement unit 15 measures the back electromotive force generated by the EPS motor 10 to transfer the back electromotive force signal to the offset calculation unit 25 and the oscilloscope. The motor position sensor 20 detects the rotation of the magnet when the EPS motor 10 rotates in a forward direction so as to generate a position signal, and transfers the position signal to the offset calculation unit 25 and the oscilloscope, in step 410.

The offset calculation unit 25 measures a time difference TDiff1 between the index signal of the position signal and the zero crossing point of the back electromotive force signal located on the left side with respect to the index signal, in step S420. Then, the offset calculation unit 25 substitutes the time difference TDiff1 in equation 1 so as to calculate an angular difference value when the EPS motor 10 rotates in a forward direction in step S430. The offset calculation unit 25 transfers the calculated angular difference value upon forward rotation to the ADC converter 30 and then the ADC converter 30 digitizes the calculated angular difference value.

When the EPS motor 10 is rotated by the drive motor 5 in the reverse direction in step S440, the back electromotive force measurement unit 15 measures the back electromotive force generated by the EPS motor 10 to transfer the back electromotive force signal to the offset calculation unit 25 and the oscilloscope. The motor position sensor 20 detects the rotation of the magnet when the EPS motor 10 rotates in a reverse direction so as to generate a position signal, and transfers the position signal to the offset calculation unit 25 and the oscilloscope, in step 450.

The offset calculation unit 25 measures the time difference TDiff2 between the index signal of the position signal and the zero crossing point of the back electromotive force signal located on the right side with respect to the index signal, in step S460. Then, the offset calculation unit 25 substitutes the time difference TDiff2 in equation 1 so as to calculate an angular difference value of the EPS motor 10 upon reverse rotation in step S470. The offset calculation unit 25 transfers the calculated angular difference value upon reverse rotation to the ADC converter 30, and then the ADC converter 30 digitizes the calculated angular difference value.

Then, the offset calculation unit 25 calculates the average of the angular difference value upon forward rotation and the angular difference value upon reverse rotation so as to an acquire an average value in step S480, and transfers the average value to the Hex converter 35. The Hex converter 35 converts the average value into a hexadecimal in step S490, and then stores the hexadecimal as offset value in the EEPROM 40 of the ECU in step S500.

As described above, the present invention calculates the average of the angular difference value upon forward rotation and the angular difference value upon reverse rotation so as to determine an offset value of the last EPS motor, thereby enabling an exact offset compensation even when the angular difference value according to the forward/reverse rotation is slightly different.

In the embodiment described above, the angular difference value is calculated by rotating the EPS motor 10 in the forward direction and then rotating the EPS motor 10 in the reverse direction, but the angular difference value may also be calculated by rotating the EPS motor 10 first in the reverse direction and then rotating the EPS motor 10 in the forward direction.

Thus, in the present invention, in order to correct a mechanical tolerance between a center of the rotor or a center of the rotation shaft of the EPS motor 10 and the motor position sensor 20, an offset value of the motor position sensor 20 is calculated by using the back electromotive force signal generated by the EPS motor 10 and the position signal generated by the motor position sensor 20. Accordingly, a difference between the actual rotation angle of the EPS motor 10 and the position measured by the motor position sensor 20 is corrected with the offset value, so as to accurately detect an actual rotation angle of the EPS motor 10.

On the other hand, the motor position sensor 20 is mounted outside to the EPS motor 10 so as to reduce the size of the EPS motor 10, and a separate EEPROM is not required in the EPS motor 10 thereby reducing a cost.

Standard information or standard documents mentioned in the above embodiment is omitted to simplify the description of the specification and constitute a part of the present specification. Thus, the addition of a part of the standard information and the standard documents to this specification or describing the part thereof in the claims is to be interpreted as have been described within the scope of the present invention.

Although the embodiments of the present invention have been described for illustrative purposes, those skilled in the art will appreciate that various modifications, additions and substitutions are possible, without departing from the scope and spirit of the invention. Therefore, exemplary aspects of the present invention have not been described for limiting purposes. The scope of the present invention shall be construed on the basis of the accompanying claims in such a manner that all of the technical ideas included within the scope equivalent to the claims belong to the present invention.

What is claimed is:

1. An apparatus for measuring an offset of an electronic power steering (EPS) motor sensor, comprising:
a drive motor that drives an EPS motor at a predetermined constant speed;
a back electromotive force measurement circuit that measures a back electromotive force generated by the EPS motor so as to generate a back electromotive force signal;
a motor position sensor that senses the rotation of the EPS motor so as to generate a position signal; and
an offset calculation circuit that calculates an offset value using a difference between the back electromotive force signal measured in the back electromotive measurement circuit and the position signal generated by the motor position sensor,
wherein the motor position sensor is located outside the EPS motor, and the drive motor drives the EPS motor in a forward direction and a reverse direction.

2. The apparatus of claim 1, wherein the position signal comprises an index signal generated at a predetermined voltage or more every time the EPS motor makes one rotation.

3. The apparatus of claim 1, wherein, when the EPS motor rotates in a forward direction, the offset calculation circuit measures, every time the EPS motor makes one rotation, a time difference between the index signal at a predetermined voltage or more included in the position signal output by the motor position sensor and a zero crossing point of the back electromotive force signal located on one side with respect to the index signal.

4. The apparatus of claim 3, wherein, when the EPS motor rotates in a reverse direction, the offset calculation circuit measures, every time the EPS motor makes one rotation, a time difference between index signal at a predetermined voltage or more included in the position signal output by the motor position sensor and a zero crossing point of the back electromotive force signal located on the other side with respect to the index signal.

5. The apparatus of claim 4, wherein the offset calculation circuit converts the time difference upon the forward rotation and the time difference upon the reverse rotation into an angular difference value upon forward rotation and an angular difference value upon reverse rotation, respectively, by using a rotation speed (RPM) of the EPS motor and the number of stator poles of the EPS motor, and configures an average value of the angular difference value upon the forward rotation and the angular difference value upon the reverse rotation as an offset value.

6. The apparatus of claim 5, wherein the offset calculation circuit does not perform the offset value configuration when a difference between the angular difference value upon the forward rotation and the angular difference value upon the reverse rotation is equal to or greater than a predetermined threshold value.

7. A method for measuring an offset of an EPS motor position sensor, the method comprising:

driving an EPS motor at a predetermined constant speed using an external drive motor;

generating a back electromotive force signal by measuring a back electromotive force generated by the EPS motor;

generating a position signal according to a rotation of the EPS motor using a motor position sensor; and calculating an offset value by using a difference between the back electromotive force signal and the position signal, wherein the motor position sensor is located outside the EPS motor, and the external drive motor drives the EPS motor in a forward direction and a reverse direction.

8. The method of claim 7, wherein calculating of the offset value comprises measuring a time difference between an index signal at a predetermined voltage or more generated every time the EPS motor makes one rotation and a zero crossing point of the back electromotive force signal.

9. The method of claim 8, wherein the calculating of the offset value comprises measuring the time difference when the EPS motor rotates in a forward direction and reverse direction, respectively.

10. The method of claim 9, wherein the calculating of the offset value comprises:

converting a time difference when the EPS motor rotates in a forward direction and the time difference when the EPS motor rotates in a reverse direction into an angular difference value upon the forward rotation and an angular difference value upon the reverse rotation, by using a rotation speed (RPM) of the EPS motor and the number of stator poles of the EPS motor, and configuring an average value of the angular difference value upon the forward rotation and the angular difference value upon the reverse rotation as an offset value.

11. The method of claim 10, wherein the calculating of the offset value does not perform the offset value calculation or configuration when the difference between the angular difference value upon the forward rotation and the angular difference value upon the reverse rotation is equal to or greater than a predetermined threshold value.

\* \* \* \* \*